(12) United States Patent
Robinson et al.

(10) Patent No.: US 9,269,162 B1
(45) Date of Patent: Feb. 23, 2016

(54) RAPID ANOMALY DETECTION (RAND)

(71) Applicants: Ian S. Robinson, Redondo Beach, CA (US); Bradley A. Flanders, Whittier, CA (US); Anthony M. Sommese, Northport, NY (US)

(72) Inventors: Ian S. Robinson, Redondo Beach, CA (US); Bradley A. Flanders, Whittier, CA (US); Anthony M. Sommese, Northport, NY (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/467,272

(22) Filed: Aug. 25, 2014

(51) Int. Cl.
*G06K 9/00* (2006.01)
*G06T 7/40* (2006.01)

(52) U.S. Cl.
CPC ........ *G06T 7/408* (2013.01); *G06T 2207/10004* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 6,347,762 B1* | 2/2002 | Sims ...................... | F41G 7/226 244/3.1 |
| 6,782,138 B1* | 8/2004 | Leisner et al. ............ | G06T 9/00 382/276 |
| 6,804,400 B1* | 10/2004 | Sharp .................... | G06K 9/0063 382/239 |
| 6,859,275 B2* | 2/2005 | Fateley ................... | G01J 3/02 356/310 |
| 7,194,111 B1* | 3/2007 | Schaum et al. ....... | G06K 9/0063 348/144 |
| 7,263,226 B1* | 8/2007 | Stein .................... | G06K 9/0063 382/190 |
| 7,593,587 B1* | 9/2009 | Rosario ................ | G06K 9/0063 348/208.4 |
| 8,265,360 B2* | 9/2012 | Sornborger ........ | G01N 21/6408 382/128 |
| 8,515,179 B1* | 8/2013 | Robinson ..................... | 382/181 |
| 8,571,325 B1* | 10/2013 | Robinson ............. | G06K 9/0063 382/103 |
| 8,705,837 B2* | 4/2014 | Michelsson ........ | G01N 21/9501 382/141 |
| 8,755,634 B2* | 6/2014 | Takahashi .......... | G06K 9/00805 382/291 |
| 8,897,570 B1* | 11/2014 | Robinson et al. .... | G06K 9/4652 250/339.01 |
| 8,897,571 B1* | 11/2014 | Robinson et al. .... | G06K 9/0063 250/339.01 |
| 2002/0012451 A1* | 1/2002 | Lin ...................... | G06K 9/0063 382/103 |
| 2009/0060266 A1* | 3/2009 | Sornborger ........ | G01N 21/6408 382/100 |
| 2009/0074297 A1* | 3/2009 | Robinson ............. | G06K 9/0057 382/191 |
| 2010/0303371 A1* | 12/2010 | Robinson et al. .... | G06K 9/6232 382/254 |
| 2012/0263382 A1* | 10/2012 | Robinson ............. | G01J 3/0264 382/191 |
| 2013/0044963 A1* | 2/2013 | Robinson et al. .... | G06K 9/0063 382/260 |
| 2013/0129256 A1* | 5/2013 | Robinson ............. | G06K 9/0063 382/298 |
| 2014/0039274 A1* | 2/2014 | Sarrafzadeh ......... | A61B 5/1118 600/300 |

OTHER PUBLICATIONS

C.-I Chang and S. Chiang, "Anomaly detection and classification for hyperspectral imagery", IEEE Trans. Geosci. and Remote Sens., vol. 40, No. 6, pp. 1314-1325 2002.*

(Continued)

*Primary Examiner* — Andrae S Allison
(74) *Attorney, Agent, or Firm* — Burns & Levinson LLP; Joseph M. Maraia

(57) ABSTRACT

A rapid anomaly detection approach with corresponding method and system to detect anomalies in scene pixels making up a hyperspectral scene, efficiently, is presented. The approach includes tailoring an approximation of an anomaly score for each scene pixel, individually, based on an "intermediate anomaly score." The intermediate score is computed using a portion of the terms used to compute the anomaly score. Scene pixels with low intermediate anomaly scores are removed from further processing. The remaining scene pixels are further processed, including computing anomaly scores to detect anomalies in these pixels. Advantageously, examples of the RAND approach process a few terms of all scene pixels, eliminate most scene pixels, and calculate more terms on high anomaly scoring scene pixels as needed.

9 Claims, 3 Drawing Sheets

(56) References Cited

OTHER PUBLICATIONS

Stein, D.W.J.; Beaven, S.G.; Hoff, L.E.; Winter, E.M.; Schaum, A.P.; Stocker, A.D., "Anomaly detection from hyperspectral imagery," in Signal Processing Magazine, IEEE , vol. 19, No. 1, pp. 58-69, Jan. 2002.*

Feng Mei; Chunhui Zhao; Liguo Wang; Hanjun Huo, "Anomaly Detection in Hyperspectral Imagery Based on Kernel ICA Feature Extraction," in Intelligent Information Technology Application, 2008. IITA '08. Second International Symposium on , vol. 1, no., pp. 869-873, Dec. 20-22, 2008.*

Patrick Hytla ; Russell C. Hardie ; Michael T. Eismann ; Joseph Meola; Anomaly detection in hyperspectral imagery: a comparison of methods using seasonal data. Proc. SPIE 6565, Algorithms and Technologies for Multispectral, Hyperspectral, and Ultraspectral Imagery XIII, 656506 (May 7, 2007).*

Chein-I Chang ; Shao-Shan Chiang ; Irving W. Ginsberg; Anomaly detection in hyperspectral imagery. Proc. SPIE 4383, Geo-Spatial Image and Data Exploitation II, 43 (Jun. 1, 2001).*

Marc A. Kolodner, "An Automated target Detection System for Hyperspectral Imaging Sensors", Johns Hopkins APL Technical Digest, vol. 27, No. 3 (2007).*

Hytla et al, Anomaly Detection in Hyperspectral Imagery: Comparison of Methods Using Diurnal and Seasonal Data, Society of Photo-Optical Instrumentation Engineers, Feb. 14, 2008; accepted Aug. 26, 2009.*

D. D Manolakis , D. Marden and G. A. Shaw "Hyperspectral image processing for automatic target detection applications", Lincoln Lab. J., vol. 14, No. 1, pp. 79-116 2003.*

Vidal et al, Simple Empty-Space Removal for Interactive Volume Rendering, Journal of Graphics, GPU, and Game Tools vol. 13, Issue 2, 2008.*

Matteoli, S.; Diani, M.; Corsini, G., "A tutorial overview of anomaly detection in hyperspectral images," in Aerospace and Electronic Systems Magazine, IEEE , vol. 25, No. 7, pp. 5-28, Jul. 2010.*

* cited by examiner

(12) United States Patent

RAPID ANOMALY DETECTION (RAND)

BACKGROUND

In many conventional image processing scenarios comprising hyperspectral imaging (HSI) systems, hyperspectral sensors collect data of an image or scene from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial or scene pixel. This scene pixel represents a given spot on the ground in a cross-scan direction for one of the lines at a given time in the scan direction. These spectra are analyzed to detect spectral anomalies.

SUMMARY

In accordance with an example, a method for detecting an anomaly in a scene pixel of a hyperspectral scene is provided, which enables anomaly detection with fewer computations. The anomaly being a spectrum different than spectra common to a plurality of scene pixels of the hyperspectral scene. The method includes, in an anomaly detector provided with hyperspectral imaging data for a plurality of scene pixels of a hyperspectral scene and provided with an anomaly equation for detecting an anomaly in a scene pixel without using an a priori spectral reference, and the anomaly equation including a set of terms sorted by descending importance, for each scene pixel in the plurality of scene pixels, computing an intermediate anomaly score based on a portion of the set of terms, the remaining terms of the set are not used to compute the intermediate anomaly score and are of less importance than the terms included in the portion. The method further includes comparing the intermediate anomaly scores to a threshold. The method further includes identifying scene pixels having intermediate anomaly scores less than the threshold as empty scene pixels that do not include anomalies. The method further includes eliminating the empty scene pixels from the plurality of scene pixels. The method further includes updating the anomaly equation to include one or more of the unused terms to form an updated anomaly equation if the number of eliminated scene pixels is less than a specified fraction of a total number of scene pixels and a number of computed intermediate anomaly scores is less than a counter. The method further includes for each scene pixel remaining in the plurality of scene pixels, computing an updated intermediate anomaly score using the updated anomaly equation. The method further includes comparing the updated intermediate anomaly scores to an updated threshold, the updated threshold being greater in value than the previous threshold. The method further includes identifying scene pixels having updated intermediate anomaly scores less than the updated threshold as empty scene pixels that do not include anomalies. The method further includes eliminating empty scene pixels from the remaining scene pixels. The method further includes for each scene pixel remaining in the plurality of scene pixels, computing a full dimension anomaly score based on the set of terms of the anomaly equation if the number of eliminated scene pixels is greater than or equal to the specified fraction of the total number of scene pixels or the number of intermediate anomaly scores computed is greater than or equal to the counter. The method further includes declaring which scene pixels include anomalies based on comparisons of the computed full dimension anomaly scores to a full dimension anomaly score threshold, the full dimension anomaly score threshold being greater in value than the threshold and the updated threshold.

In accordance with another example, a system for detecting an anomaly in a scene pixel of a hyperspectral scene is provided. The anomaly is a spectrum different than spectra common to a plurality of scene pixels of the hyperspectral scene. The system includes memory having computer executable instructions thereupon and at least one interface receiving a hyperspectral imaging data for a plurality of scene pixels of a hyperspectral scene and an anomaly equation for detecting an anomaly in a scene pixel without using an a priori spectral reference, the anomaly equation including a set of terms sorted by descending importance. The system further includes an anomaly detector coupled to the memory and the at least one interface coupled to the memory and the at least one interface. The computer executable instructions when executed by the anomaly detector cause the anomaly detector to compute an intermediate anomaly score for each scene pixel in the plurality of scene pixels based on a portion of the set of terms, the remaining terms of the set are not used to compute the intermediate anomaly score and are of less importance than the terms included in the portion. The anomaly detector further caused to compare the intermediate anomaly scores to a threshold. The anomaly detector further caused to identify scene pixels having intermediate anomaly scores less than the threshold as empty scene pixels that do not include anomalies. The anomaly detector further caused to eliminate the empty scene pixels from the plurality of scene pixels. The anomaly detector further caused to update the anomaly equation to include one or more of the unused terms to form an updated anomaly equation if the number of eliminated scene pixels is less than a specified fraction of a total number of scene pixels and a number of computed intermediate anomaly scores is less than a counter. The anomaly detector further caused to compute an updated intermediate anomaly score for each scene pixel remaining in the plurality of scene pixels using the updated anomaly equation. The anomaly detector further caused to compare the updated intermediate anomaly scores to an updated threshold, the updated threshold being greater in value than the previous threshold. The anomaly detector further caused to identify scene pixels having updated intermediate anomaly scores less than the updated threshold as empty scene pixels that do not include anomalies. The anomaly detector further caused to eliminate empty scene pixels from the remaining scene pixels. The anomaly detector further caused to, for each scene pixel remaining in the plurality of scene pixels, compute a full dimension anomaly score based on the set of terms of the anomaly equation if the number of eliminated scene pixels is greater than or equal to the specified fraction of the total number of scene pixels or the number of intermediate anomaly scores computed is greater than or equal to the counter. The anomaly detector further caused to declare which scene pixels include anomalies based on comparisons of the computed full dimension anomaly scores to a full dimension anomaly score threshold, the full dimension anomaly score threshold being greater in value than the threshold and the updated threshold.

In accordance with yet another example, a tangible computer-readable storage medium having computer readable instructions stored therein for detecting an anomaly in a scene pixel of a hyperspectral scene is provided. The anomaly is a spectrum different than spectra common to a plurality of scene pixels of the hyperspectral scene The computer readable instructions when executed by one or more processors provided with a hyperspectral imaging data for a plurality of scene pixels of a hyperspectral scene and an anomaly equation for detecting an anomaly in a scene pixel without using an a priori spectral reference, the anomaly equation including a set of terms sorted by descending importance, cause the one or more processors to compute an intermediate anomaly score for each scene pixel in the plurality of scene pixels based on a portion of the set of terms, the remaining terms of the set are not used to compute the intermediate anomaly score and are of less importance than the terms included in the portion. The one or more processors further caused to compare the intermediate anomaly scores to a threshold. The one or more processors further caused to identify scene pixels having intermediate anomaly scores less than the threshold as empty scene pixels that do not include anomalies. The one or more processors further caused to eliminate empty scene pixels from the remaining scene pixels. The one or more processors further caused to update the anomaly equation to include one or more of the unused terms to form an updated anomaly equation if the number of eliminated scene pixels is less than a specified fraction of a total number of scene pixels and a number of computed intermediate anomaly scores is less than a counter. The one or more processors further caused to compute an updated intermediate anomaly score for each scene pixel remaining in the plurality of scene pixels using the updated anomaly equation. The one or more processors further caused to compare the updated intermediate anomaly scores to an updated threshold, the updated threshold being greater in value than the previous threshold. The one or more processors further caused to identify scene pixels having updated intermediate anomaly scores less than the updated threshold as empty scene pixels that do not include anomalies. The one or more processors further caused to eliminate empty scene pixels from the remaining scene pixels. The one or more processors further caused to for each scene pixel remaining in the plurality of scene pixels, compute a full dimension anomaly score based on the set of terms of the anomaly equation if the number of eliminated scene pixels is greater than or equal to the specified fraction of the total number of scene pixels or the number of intermediate anomaly scores computed is greater than or equal to the counter. The one or more processors further caused to declare which scene pixels include anomalies based on comparisons of the computed full dimension anomaly scores to a full dimension anomaly score threshold, the full dimension anomaly score threshold being greater in value than the threshold and the updated threshold.

In some examples, any of the aspects above can include one or more of the following features.

In other examples of the method, the hyperspectral imaging data includes M principal components of the hyperspectral scene. The method includes computing the intermediate anomaly score from a subset of the M principal components, the remaining principal components are not used to compute the intermediate anomaly score, updating the anomaly equation includes updating the anomaly equation to include one or more of the unused principal components to form the updated anomaly equation, and computing the full dimension anomaly score includes computing the full dimension anomaly score based on the M principal components.

In some examples of the method, the hyperspectral imaging data includes a plurality of average bands, which are derived by averaging the HSI spectrum of each scene pixel in the plurality of scene pixels. The method includes computing the intermediate anomaly score from a subset of the plurality of average bands, the remaining average bands are not used to compute the intermediate anomaly score, updating the anomaly equation to include one or more of the average bands to form the updated anomaly equation, and computing the full dimension anomaly score based on the plurality of average bands.

In some examples of the method, the hyperspectral imaging data includes N coefficients for each scene pixel, which are derived by unmixing N basis vectors from a spectral vector associated each scene pixel. The method includes computing the intermediate anomaly score from a subset of the N coefficients, the remaining coefficients are not used to compute the intermediate anomaly score, updating the anomaly equation to include one or more of the unused coefficients to form the updated anomaly equation, and computing the full dimension anomaly score based on the N coefficients.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

Figure 1:
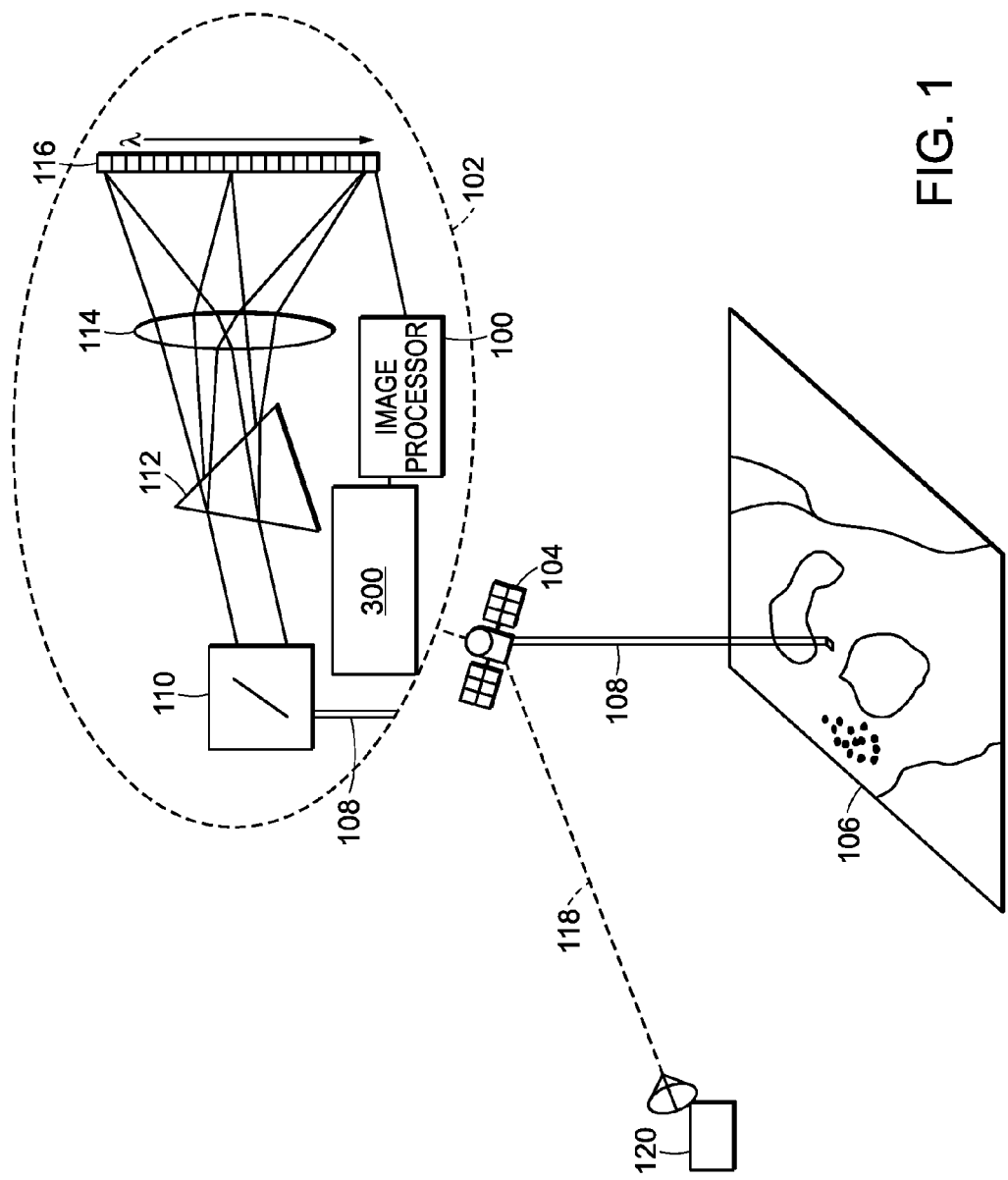
FIG. 1 is an illustration of an example imaging system with an anomaly detector.

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Depicted in FIG. 1 is an example of imaging system 102 that is configured to process images and to detect materials/targets/anomalies in backgrounds/scenes. By way of example only, imaging system 102 may be a hyperspectral imaging (HSI) system. The term "hyperspectral" refers to imaging narrow spectral bands over a continuous spectral range, and producing the spectra of all scene pixels in a hyperspectral scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image (HSI) scene to image processor 100. In an example, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106.

Figure 2:
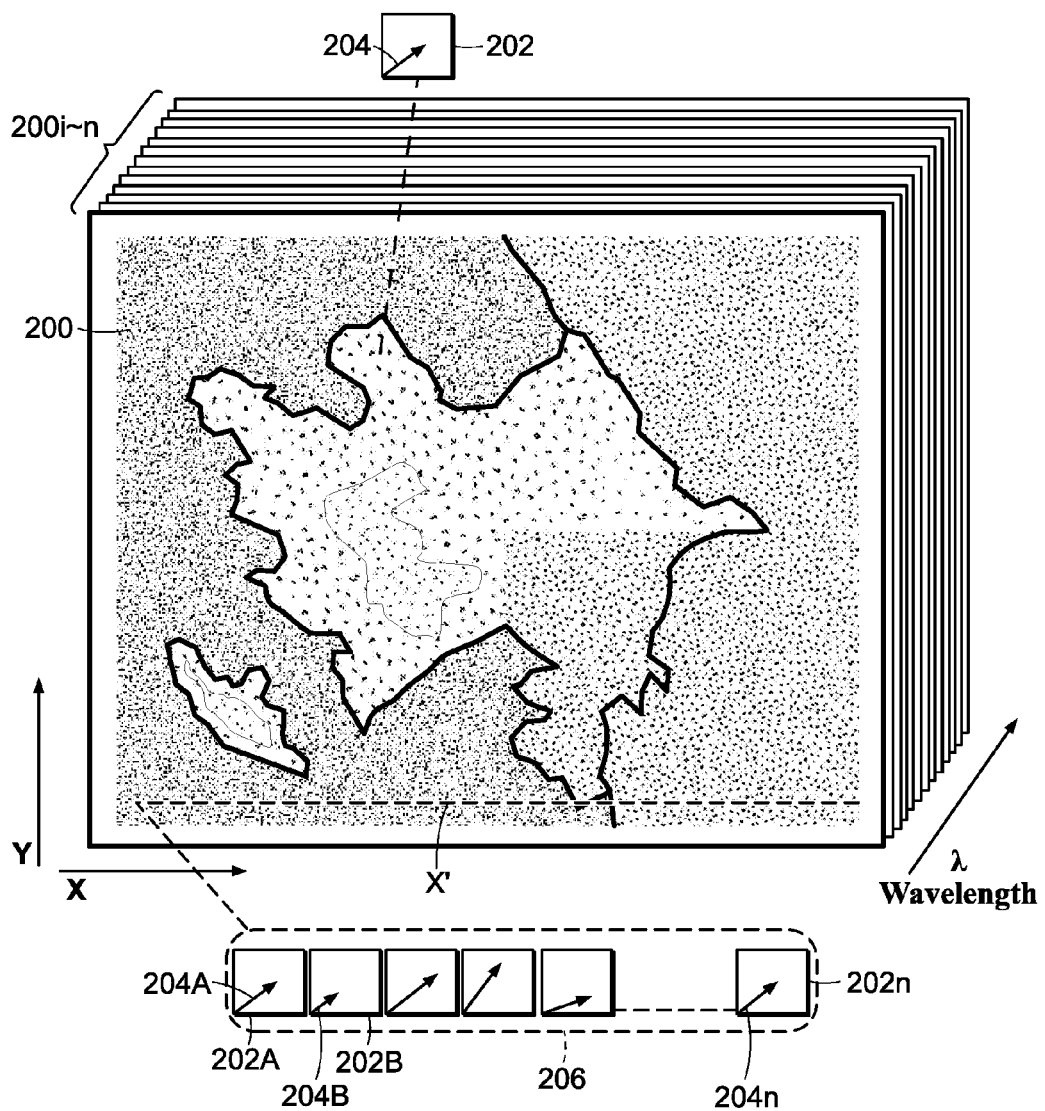
FIG. 2 is an illustration of an example representation of one or more images of a hyperspectral scene including a plurality of scene pixels.

FIG. 2 provides an exemplary representation of hyperspectral image 200, which may generally include a plurality of images 200i-n, which may be acquired in a substantially simultaneous manner across various different wavelength ($\lambda$) bands. As shown in FIG. 2, the hyperspectral image 200 may include a plurality of scene pixels 202 arranged according to an x-y coordinate system, although it will be apparent that alternate coordinate systems may be employed in various circumstances. (A scene pixel can also be referred to as "spatial pixel" or simply "pixel," all of which may be used interchangeably herein.) In one example, each respective scene pixel 202 may have a spectral vector 204 associated therewith, wherein the spectral vector 204 may contain one or more spectral measurements representing energy associated with the respective scene pixel 202. For example, FIG. 2 further illustrates an enlarged section 206 representing a particular row X' of scene pixels 202a-n from one of the plurality of images 200i-n, wherein each of the various scene pixels 202a-n in the row X' may have a spectral vector 204a-n representing the energy associated with the respective pixel 202.

A key function of a HSI system is detecting anomalies in scene pixels making up a hyperspectral scene. An anomaly is spectrum that is not known beforehand but is different than spectra common to the scene pixels. Detecting an anomaly is contrasted with detecting a target which requires the unique spectrum or "signature" associated with the target to be known beforehand. Anomaly detection is a critical to the operation of a HSI system in a denied territory. Anomaly detection provides the capability for the system to learn new targets, as scene pixels detected, initially, as anomalies may become targets whose spectrum is known on a subsequent flight.

A common form of anomaly detector is the Reed-Xioli or "RX" anomaly detection filter, $RX=(x-\mu)^T Cov^{-1}(x-\mu)$, where x is a pixel's spectral vector and X is the scene spectral mean. The RX anomaly detection filter is effective but requires a lot of computation for each scene pixel. Computation of the RX anomaly detection filter for all scene pixels requires $P*D^2$ operations, where P is the number scene pixels and D is the number of dimensions or bands. A hyperspectral scene typically includes 1E6 scene pixels. A HSI sensor typically collects 200-400 narrow spectral bands over a given sensing regime (e.g., visible and near infra-red (VNIR)/short wave infrared (SWIR) and long wave infrared (LWIR)). Therefore, anomaly detection is ordinarily a very computation intensive process.

As shown, the imaging system 102 includes an anomaly detector 300 for detecting anomalies in scene pixels making up a hyperspectral scene. However, it may not be practical for the anomaly detector 300 to perform so many operations, as described above, to detect an anomaly, especially when the anomaly detector 300 is located "on-board" the remote imaging system 104. It may also not be practical to perform this many operations "on-ground." A ground station may have to process up to several terabytes of data per day.

A rapid anomaly detection or RAND approach is presented to efficiently detect anomalies in scene pixels making up a hyperspectral scene. The approach includes tailoring an approximation of an anomaly score for each scene pixel, individually, based on an "intermediate anomaly score." The intermediate anomaly score is computed using a portion of the terms used to compute an anomaly score, herein referred to as a "full dimension anomaly score" The anomaly score computed by the RX anomaly detection filter described above is an example of a full dimension anomaly score.

The approach further includes focusing the tailoring to eliminate scene pixels with low anomaly scores from further processing. Because most scene pixels in a hyperspectral scene have low anomaly scores, with only few having high anomaly scores, a large number of scene pixels can be removed from processing making further processing more efficient. Studies have shown that fewer terms in an anomaly scoring expression (e.g., the RX anomaly detection filter equation described above) are needed to identify low anomaly scoring scene pixels than are needed to identify high anomaly scoring pixels. Advantageously, examples of the RAND approach process a few terms of all scene pixels, eliminate most scene pixels, and calculate more terms on high anomaly scoring scene pixels (e.g., the remaining scene pixels) as needed.

In general, examples of the RAND approach divide the anomaly detection problem into two parts. First, an intermediate anomaly filter (e.g., an anomaly equation with a few terms) is applied to all scene pixels in a plurality to produce an intermediate anomaly score for each scene pixel. Several ways for implementing this intermediate stage are described below. The intermediate anomaly score is different from the full dimension anomaly score. The full dimension anomaly score is used to detect a scene pixel with an anomaly. In contrast, the intermediate anomaly score is used to detect a scene pixel without an anomaly. Scene pixels having intermediate anomaly scores below a threshold are declared "empty scene pixels" and are not processed further.

To aid in identifying empty scene pixels, in some examples of the RAND approach, an optional step is included for estimating the contribution of the un-used terms in the full dimension anomaly score with few computations. This estimation could consist of an upper bound of a full dimension anomaly score or an estimate of the full dimension anomaly score. If an estimate of the full dimension anomaly score is calculated, scene pixels that are close to the threshold but have estimated full dimension scores below a second, higher threshold are also declared empty scene pixels. If an upper bound of the full dimension score is calculated, the resulting score can be compared to the threshold used by full dimension anomaly processing without risk of missing any anomalies.

Having identified which scene pixels of the hyperspectral scene are empty scene pixels, examples of the RAND approach apply one or more full dimension anomaly detection filters (e.g., the RX anomaly detection filter described above) to the remaining pixels. The results of the filter or combination of filters are thresholded to declare whether an anomaly is present or not in a scene pixel. Operating on a few percent or less of the scene pixels (e.g., 0.1%-2%) with full dimension and operating on the bulk of scene pixels with far less processing using many fewer dimensions (e.g. 10-100× fewer dimensions) saves 50-1000× of the processing steps, depending on the number of scene pixels processed.

Figure 3:
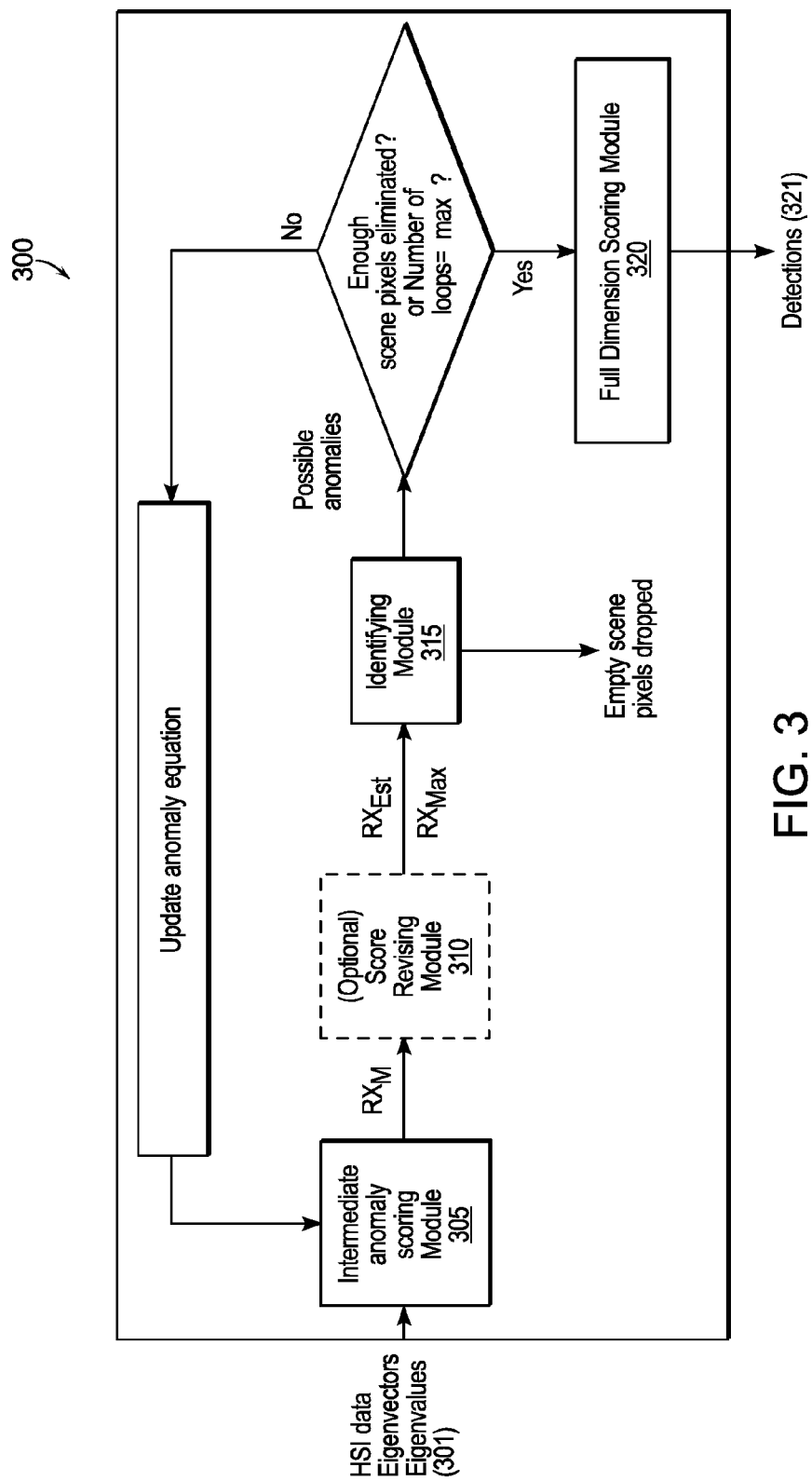
FIG. 3 is a functional block diagram of an example of the anomaly detector.

FIG. 3 shows an example of the anomaly detector 300 for implementing examples of the RAND approach. The anomaly detector 300 includes an intermediate anomaly scoring module 305, an optional score revising module 310, an identifying module 315, and a full dimension anomaly scoring module 320 communicatively coupled to one another as shown.

The anomaly detector 300 is provided with hyperspectral imaging data 301 for a plurality of scene pixels in a hyperspectral scene. The hyperspectral imaging data 301 includes, for example, a HSI data cube, and eigenvectors and eigenvalues associated with the input date cube. Some examples of the RAND approach calculate the eigenvectors and eigenvalues from the data cube if they are not provided.

The intermediate anomaly scoring module 305 computes an intermediate anomaly score ($RX_M$) for each scene pixel in the plurality of scene pixels. The intermediate anomaly scoring module 305 uses the first few terms of an anomaly score (anomaly equation) comprising the first few eigenvectors and eigenvalues (e.g., 3 to 5) of the input hyperspectral imaging data 301 to compute the intermediate anomaly score 306.

The identifying module 315 compares the intermediate anomaly scores to a threshold appropriate for the first pass intermediate score. (Selecting a suitable threshold is discussed later in conjunction with the score revising module 310.) The identifying module 315 declares scene pixels below the threshold to be not of interest. These pixels are declared empty scene pixels that do not include anomalies and are flagged for no further processing.

A convenient example of the identifying module 315 eliminates empty scene pixels from the plurality of scene pixels. It is noted, that the value of the threshold for comparing the intermediate anomaly score is smaller than the value of a threshold used for comparing the full dimension anomaly score. The threshold is used to identify, and in some examples, eliminate low anomaly scoring pixels rather than identifying high anomaly scoring pixels.

Scene pixels above the threshold (e.g., scene pixels remaining in the plurality of scene pixels) potentially include anomalies, and are further processed by the anomaly detector 300. For sake of discussion and for readability, scene pixels that may include anomalies are called "potential anomalies." If a number of potential anomalies is sufficiently small (e.g., as determined by a set number or a set fraction of the plurality of scene pixels are identified as empty scene pixels), the full dimension anomaly scoring module 320 calculates the remaining terms of the anomaly score (anomaly equation) to generate a full dimension anomaly score for each of the remaining scene pixels. If the number of potential anomalies is large (e.g., as determined by a set number or a set fraction of the plurality of scene pixels are identified as empty scene pixels), the intermediate anomaly scoring module 305 adds a few more of the remaining terms of the anomaly score (anomaly equation) to compute an updated intermediate anomaly score for those remaining scene pixels.

In the case when a few more terms are calculated for potential anomalies, the updated intermediate anomaly score is compared to an updated threshold appropriate for a second pass intermediate score. The identifying module 315 declares scene pixels below the updated threshold to be not of interest. These pixels are declared empty scene pixels that do not include anomalies and are flagged for no further processing.

A convenient example of the identifying module 315 eliminates empty scene pixels from the plurality of scene pixels. It is noted, that the value of the updated threshold for comparing the updated intermediate anomaly score is higher than the value of the threshold used in the prior iteration but lower than the threshold value used for comparing the full dimension anomaly score.

The foregoing iterative loop continues until sufficiently few scene pixels remain or the anomaly detector 300 executes a maximum number of loops. A counter may be provided (e.g., as an operator defined parameter) or incremented to determine whether sufficiently few scene pixel remain or whether a maximum number of loops is obtained.

The full dimension anomaly scoring module 320 calculates the remaining terms of the anomaly score (anomaly equation) to generate a full dimension anomaly score for each scene pixel still flagged as potential anomalies (e.g., scene pixels remaining in the plurality). The full dimension anomaly scoring module 320 compares the full dimension anomaly score with a full dimension threshold. Scene pixels with scores above the full dimension threshold are considered to include anomalies and the anomaly detector 300 returns these scene pixels or an indicator (e.g., detection 321) that anomalies are detected in these scene pixels The RAND approach contemplates several ways of computing the intermediate anomaly score. In a convenient example of the RAND approach, provided M eigenvector coefficients computed for each scene pixel, the intermediate anomaly scoring module 305 computes the intermediate anomaly score from the largest (top) M (e.g. 3-5) principal components of the hyperspectral scene. These are the M eigenvectors of the Coy with the largest corresponding eigenvalues of the D eigenvector/eigenvalue pairs computed for the Coy. The computation requires $P*M^2$ number of operations.

If the M eigenvector coefficients are not provided, they may be calculated from the HSI datacube, requiring $P*M*D$ operations. The coefficients are calculated by unmixing the principal components from each scene pixel and dividing the resulting unmixing coefficient by the square root of the eigenvalue corresponding to the eigenvector. The result is each pixel has M whitened coefficients.

The intermediate anomaly score is the dot product of the M coefficients with themselves and is equivalent to the output of the anomaly score (anomaly equation) for M coefficients. When M is 3, for example, the foregoing computation requires approximately $P*M^2$ or 9P operations. The intermediate anomaly score can also be computed by equation 1 below, in which the full eigenvalue is a divisor before summing dot product terms. The advantage to this way of computing the intermediate anomaly score is that enables an upper bound to be estimated on the full dimension anomaly score and will be described later in detail.

Using flight test data, it has been shown that some examples of the RAND approach separate pixels with targets from empty pixels with M as low as 3 terms. It has also been show that some examples of the RAND approach eliminated over 99% of the scene pixels without any degradation to probability of detection (Pd) and probability of false alarm (Pfa).

In another example of the RAND approach, the HSI spectrum of each pixel has been averaged over multiple adjacent wavebands and provided as a "multi spectral" data set of average bands (e.g., 5-10 HSI bands). These average bands are the used to create another spectral data cube with fewer dimensions. For example, 3 bands (1-3) are averaged together to form 1 band (the new 1), the next 3 (4-6) are averaged together to form the next band (the new 2), etc.

In this example, the RAND approach reduces M by a factor of 3 (K=M/3) which, in turn, reduces the covariance matrix calculation to K×K dimensions, which is faster to calculate than a matrix of M×M dimensions. K principal components are then calculated from the covariance matrix, which again is faster to calculate than M principal components. In this example of the RAND approach, the anomaly equation is "rebuilt" to include K terms. The intermediate anomaly scoring module 305 uses the first few terms of the K terms to compute the intermediate anomaly score, as described above.

In another example of the RAND approach, the HSI spectrum of each scene pixel has been reduced to N coefficients. The unmixing of basis vectors is a common approach to reducing the dimensionality of the incoming data cube. Other approaches are described in U.S. Pat. No. 8,675,989 OPTIMIZED ORTHONORMAL SYSTEM AND METHOD FOR REDUCING DIMENSIONALITY OF HYPERSPECTRAL IMAGES, filed Apr. 13, 2011, which is incorporated herein by reference in its entirety. These dimension reducing approaches have the advantage of discovering N basis vectors while simultaneously reducing each scene pixel to N coefficients and a residual magnitude, requiring approximately P*N*D operation.

In this example of the RAND approach, an input data cube is expressed as N dimensional basis vector coefficients rather than M dimensional spectral vectors. A N×N covariance matrix is calculated from the input data cube from which N principal components are computed. The anomaly equation is rebuilt to include N terms, which is typically 3-10. The intermediate anomaly scoring module 305 uses the first few terms of the N terms, to compute the intermediate anomaly score, as described above, requiring roughly P*N^2 operations.

Provided D whitened coefficients computed for every scene pixel and the dot product of the D principal components of each whitened scene pixel with itself, the full dimension anomaly score can be calculated. The full dimension anomaly score, RX, can be written as:

$$RX = \sum_{i=1}^{D} \frac{p_i^2}{\lambda_i} \text{ where}$$

$p_i$ are principal component coefficients $\lambda_i$ are eigenvalues

The intermediate anomaly score, $RX_M$, contains only the first M terms $$RX_M = \sum_{i=1}^{M} \frac{p_i^2}{\lambda_i}$$

Turning now to a discussion of thresholds used to compare against intermediate anomaly scores to identify empty scene pixels. Care is needed in selecting an appropriate series of thresholds because the anomaly score of every scene pixel increases as each term is added to the intermediate anomaly score. The anomaly score is computed using an anomaly equation that can be expressed as a sum of terms. All of the terms are positive, so the intermediate anomaly scoring module 305 computes an intermediate score that is less than the full (final) dimension anomaly score. Because the terms are ordered in descending importance the most important terms generally come first in the anomaly equation. As such, the intermediate anomaly score calculation for most scene pixels start with the important terms added, and then progressively less important terms added.

However, it is theoretically possible for a scene pixel to have small values of what are usually important terms and then a large value of what is usually a less important term. In other words, a large increase in the anomaly score may occur way down in a term that is usually small throughout the hyperspectral scene. This creates a risk of incorrectly declaring that a scene pixel does not include an anomaly and missing the anomaly.

In some examples of the RAND approach, the threshold includes a safety margin. With this safety margin, the threshold is safely below the full (final) dimension anomaly score threshold, just in case one of the later (less important) terms that has not be evaluated yet is unexpectedly large in value. In these examples, as more terms are evaluated, the threshold increases towards to the full (final) dimension anomaly score threshold because a smaller safety margin is needed for unexpectedly large terms.

Other examples of the RAND approach further reduce the risk of missing anomalies at the cost of added calculations. In each of these examples, the score revising module 310 revises an intermediate anomaly score resulting in a revised intermediate anomaly score. Instead of comparing the intermediate anomaly score directly to a threshold, the identifying module 315 compares the revised intermediate anomaly scores to the threshold.

One example of the score revising module 310 approximates all unevaluated terms of the anomaly score to obtain an estimate of their anomaly score. Adding this estimated term to the intermediate anomaly score gives an estimate of the full dimension anomaly score, $RX_{EST}$. The identifying module 315 compares the estimate ($RX_{EST}$) to a threshold at each loop to eliminate certain pixels and select pixels for continued evaluation.

$$RX_{EST} = RX_M + \frac{e^2}{\bar{\lambda}}$$

where $$\bar{\lambda} = \frac{\sum_{i=M+1}^{D} \lambda_i}{(D-M)} \text{ and } e^2 = \sum_{i=M+1}^{D} p_i^2 = s^2 - \sum_{i=1}^{M} p_i^2 \text{ and } s^2 = \sum_{i=1}^{D} (x_i - \mu_i)^2$$

In this example, the threshold changes slightly with each iteration to account for decreasing uncertainty in the anomaly score rather than changing to account for an increasing intermediate anomaly score, as in the case of the safety margin example described above. The exact sum of the unevaluated terms is unknown but the sum of the terms is approximately known. As such, in this example of the RAND approach, a safety margin for a threshold can be smaller than the safety margin previously described above. The advantage of a smaller safety margin is that it will identify more pixels as empty and eliminate more pixels from additional processing.

Another example of the score revising module 310 calculates an upper bound, $RX_{MAX}$, for all the unevaluated terms, and thus an upper bound for the full (final) dimension anomaly score. The identifying module 315 compares the upper bound ($RX_{MAX}$) to the full dimension anomaly score threshold at each loop to eliminate certain scene pixels and select scene pixels for continued evaluation. In this example, the same threshold is used for each iteration and the maximum score drops as more terms are added to the intermediate anomaly score and the uncertainty in the score decreases.

A key feature of the bounding scheme is based on realizing that the full (final) dimension anomaly score value differs from the magnitude of a scene pixel only in weighting each principal component by its eigenvalue. By assuming a constant eigenvalue, the eigenvalue can be factored out to give bounds (e.g., the upper bound, $RX_{MAX}$) for the unevaluated anomaly score terms as the known magnitude of the unevaluated terms divided by the bounding value of the unevaluated eigenvalues.

Provided M whitened coefficients computed for every scene pixel and the dot product of the M principal components of each whitened scene pixel with itself, the bounds (e.g., the upper bound, $RX_{MAX}$) for the remaining unevaluated components can be calculated based on the partial magnitude of each scene pixel in unevaluated components and the maximum or minimum eigenvalue in unevaluated components. Using the minimum eigenvalue determines a maximum anomaly score for each scene pixel.

$$RX = \sum_{i=1}^{D} \frac{p_i^2}{\lambda_i} \text{ where}$$

$p_i$ are principal component coefficients $\lambda_i$ are eigenvalues

Rigorous upper and lower bounds can be calculated by factoring out either the M+1th eigenvalue or the last eigenvalue, which is the Dth eigenvalue. Note, the decomposition of the Coy into eigenvectors and eigenvalues automatically sorts eigenvalues in descending order of importance.

The upper bound, $RX_{MAX}$, is shown in equation below and is useful to ensure examples of the RAND approach do not eliminate pixels that could contain anomalies.

$$RX_M + \frac{e^2}{\lambda_{M+1}} < RX < RX_M + \frac{e^2}{\lambda_D}$$

where $$RX_M = \sum_{i=1}^{M} \frac{p_i^2}{\lambda_i} \text{ and } e^2 = \sum_{i=M+1}^{D} p_i^2 = s^2 - \sum_{i=1}^{M} p_i^2 \text{ and } s^2 = \sum_{i=1}^{D} (x_i - \mu_i)^2$$

This example of the RAND approach requires more calculations primarily because it calculates a rigorous bound (e.g., the upper bound, $RX_{MAX}$) on the maximum anomaly score and requires evaluation of more terms than the other examples. However, the benefit of this example is that it is guaranteed to make exactly the same decisions as the full dimension anomaly score but with fewer computations. Therefore, this example of the RAND approach may be favored in critical applications in which missed anomalies are tolerated less.

In an another example of the RAND approach provided with scene pixels, each reduced to N coefficients and a residual magnitude, an example of the score revising module 310 computes, per scene pixel, an upper bound ($RX_{MAX}$) based on an associated residual magnitude. The score revising module 310 subtracts the residual magnitude of each scene pixel by the mean magnitude and divides the total by the standard deviation of the residual magnitudes. The result is squared to convert the residual magnitude of each pixel to a variance term. The sum of the intermediate anomaly score and the variance term bound the full dimension anomaly score.

The above-described systems and methods can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The anomaly detector 300 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., anomaly detector 300) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for detecting an anomaly in a scene pixel of a hyperspectral scene, the anomaly being a spectrum different than spectra common to a plurality of scene pixels of the hyperspectral scene, the method comprising:
   in an anomaly detector provided with hyperspectral imaging data for a plurality of scene pixels of a hyperspectral scene and provided with an anomaly equation for detecting an anomaly in a scene pixel without using an a priori spectral reference, and the anomaly equation including a set of terms sorted by descending importance:
   for each scene pixel in the plurality of scene pixels, computing an intermediate anomaly score based on a portion of the set of terms, the remaining terms of the set are not used to compute the intermediate anomaly score and are of less importance than the terms included in the portion;
   comparing the intermediate anomaly scores to a threshold;
   identifying scene pixels having intermediate anomaly scores less than the threshold as empty scene pixels that do not include anomalies;
   eliminating the empty scene pixels from the plurality of scene pixels;
   updating the anomaly equation to include one or more of the unused terms to form an updated anomaly equation if the number of eliminated scene pixels is less than a specified fraction of a total number of scene pixels and a number of computed intermediate anomaly scores is less than a counter;
   for each scene pixel remaining in the plurality of scene pixels, computing an updated intermediate anomaly score using the updated anomaly equation;
   comparing the updated intermediate anomaly scores to an updated threshold, the updated threshold being greater in value than the threshold;
   identifying scene pixels having updated intermediate anomaly scores less than the updated threshold as empty scene pixels that do not include anomalies;
   eliminating empty scene pixels from the remaining scene pixels;
   for each scene pixel remaining in the plurality of scene pixels, computing a full dimension anomaly score based on the set of terms of the anomaly equation if the number of eliminated scene pixels is greater than or equal to the specified fraction of the total number of scene pixels or the number of intermediate anomaly scores computed is greater than or equal to the counter; and declaring which scene pixels include anomalies based on comparisons of the computed full dimension anomaly scores to a full dimension anomaly score threshold, the full dimension anomaly score threshold being greater in value than the threshold and the updated threshold.

2. The method of claim 1 wherein the hyperspectral imaging data includes M principal components of the hyperspectral scene;

wherein computing the intermediate anomaly score includes computing the intermediate anomaly score from a subset of the M principal components, the remaining principal components are not used to compute the intermediate anomaly score;

wherein updating the anomaly equation includes updating the anomaly equation to include one or more of the unused principal components to form the updated anomaly equation; and wherein computing the full dimension anomaly score includes computing the full dimension anomaly score based on the M principal components.

3. The method of claim 1 wherein the hyperspectral imaging data includes a plurality of average bands, which are derived by averaging the HSI spectrum of each scene pixel in the plurality of scene pixels;

wherein computing the intermediate anomaly score includes computing the intermediate anomaly score from a subset of the plurality of average bands, the remaining average bands are not used to compute the intermediate anomaly score;

wherein updating the anomaly equation includes updating the anomaly equation to include one or more of the average bands to form the updated anomaly equation; and wherein computing the full dimension anomaly score includes computing the full dimension anomaly score based on the plurality of average bands.

4. The method of claim 1 wherein the hyperspectral imaging data includes N coefficients for each scene pixel, which are derived by unmixing N basis vectors from a spectral vector associated each scene pixel;

wherein computing the intermediate anomaly score includes computing the intermediate anomaly score from a subset of the N coefficients, the remaining coefficients are not used to compute the intermediate anomaly score;

wherein updating the anomaly equation includes updating the anomaly equation to include one or more of the unused coefficients to form the updated anomaly equation; and wherein computing the full dimension anomaly score includes computing the full dimension anomaly score based on the N coefficients.

5. The method of claim 1 further comprising revising the intermediate anomaly score to form a revised anomaly score and wherein comparing includes comparing the revised anomaly score to the threshold.

6. The method of claim 5 wherein revising further includes approximating the unevaluated terms of the anomaly equation to form a score corresponding with unevaluated terms;

adding the score to the intermediate anomaly score to form the revised anomaly score; and comparing the revised anomaly score to a threshold that changes "slightly with each iteration to account for decreasing uncertainty in the score rather than changing to account for an increasing score as in the basic approach".

7. The method of claim 5 wherein revising further includes calculating an upper bound of the unevaluated terms of the anomaly equation;

adding the upper bound to the intermediate anomaly score to form the revised anomaly score; and comparing the revised anomaly score to a threshold used to compare a full dimension anomaly score.

8. A system for detecting an anomaly in a scene pixel of a hyperspectral scene, the anomaly being a spectrum different than spectra common to a plurality of scene pixels of the hyperspectral scene, the system comprising:

a memory having computer executable instructions thereupon;

at least one interface receiving a hyperspectral imaging data for a plurality of scene pixels of a hyperspectral scene and an anomaly equation for detecting an anomaly in a scene pixel without using an a priori spectral reference, the anomaly equation including a set of terms sorted by descending importance; and an anomaly detector coupled to the memory and the at least one interface, the computer executable instructions when executed by the anomaly detector cause the anomaly detector to:

compute an intermediate anomaly score for each scene pixel in the plurality of scene pixels based on a portion of the set of terms, the remaining terms of the set are not used to compute the intermediate anomaly score and are of less importance than the terms included in the portion;

compare the intermediate anomaly scores to a threshold;

identify scene pixels having intermediate anomaly scores less than the threshold as empty scene pixels that do not include anomalies;

eliminate the empty scene pixels from the plurality of scene pixels;

update the anomaly equation to include one or more of the unused terms to form an updated anomaly equation if the number of eliminated scene pixels is less than a specified fraction of a total number of scene pixels and a number of computed intermediate anomaly scores is less than a counter;

compute an updated intermediate anomaly score for each scene pixel remaining in the plurality of scene pixels using the updated anomaly equation;

compare the updated intermediate anomaly scores to an updated threshold, the updated threshold being greater in value than the threshold;

identify scene pixels having updated intermediate anomaly scores less than the updated threshold as empty scene pixels that do not include anomalies;

eliminate empty scene pixels from the remaining scene pixels;

for each scene pixel remaining in the plurality of scene pixels, compute a full dimension anomaly score based on the set of terms of the anomaly equation if the number of eliminated scene pixels is greater than or equal to the specified fraction of the total number of scene pixels or the number of intermediate anomaly scores computed is greater than or equal to the counter; and declare which scene pixels include anomalies based on comparisons of the computed full dimension anomaly scores to a full dimension anomaly score threshold, the full dimension anomaly score threshold being greater in value than the threshold and the updated threshold.

9. A tangible non-transitory computer-readable storage medium having computer readable instructions stored therein for detecting an anomaly in a scene pixel of a hyperspectral scene, the anomaly being a spectrum different than spectra common to a plurality of scene pixels of the hyperspectral scene, which when executed by one or more processors provided with a hyperspectral imaging data for a plurality of scene pixels of a hyperspectral scene and an anomaly equation for detecting an anomaly in a scene pixel without using an a priori spectral reference, the anomaly equation including a set of terms sorted by descending importance, cause the one or more processors to:

compute an intermediate anomaly score for each scene pixel in the plurality of scene pixels based on a portion of the set of terms, the remaining terms of the set are not used to compute the intermediate anomaly score and are of less importance than the terms included in the portion;

compare the intermediate anomaly scores to a threshold;

identify scene pixels having intermediate anomaly scores less than the threshold as empty scene pixels that do not include anomalies;

eliminate the empty scene pixels from the plurality of scene pixels;

update the anomaly equation to include one or more of the unused terms to form an updated anomaly equation if the number of eliminated scene pixels is less than a specified fraction of a total number of scene pixels and a number of computed intermediate anomaly scores is less than a counter;

compute an updated intermediate anomaly score for each scene pixel remaining in the plurality of scene pixels using the updated anomaly equation;

compare the updated intermediate anomaly scores to an updated threshold, the updated threshold being greater in value than the threshold;

identify scene pixels having updated intermediate anomaly scores less than the updated threshold as empty scene pixels that do not include anomalies;

eliminate empty scene pixels from the remaining scene pixels;

for each scene pixel remaining in the plurality of scene pixels, compute a full dimension anomaly score based on the set of terms of the anomaly equation if the number of eliminated scene pixels is greater than or equal to the specified fraction of the total number of scene pixels or the number of intermediate anomaly scores computed is greater than or equal to the counter; and declare which scene pixels include anomalies based on comparisons of the computed full dimension anomaly scores to a full dimension anomaly score threshold, the full dimension anomaly score threshold being greater in value than the threshold and the updated threshold.

\* \* \* \* \*